March 11, 1969   J. MIKLAS   3,431,885
EVENT INDICATOR
Filed March 14, 1966

INVENTOR
JOHN MIKLAS
BY Robert J. Steininger

ATTORNEY

United States Patent Office 3,431,885
Patented Mar. 11, 1969

3,431,885
EVENT INDICATOR
John Miklas, 5503 31st Ave., Kenosha, Wis. 53140
Filed Mar. 14, 1966, Ser. No. 533,909
U.S. Cl. 116—135
Int. Cl. G09f 9/00
1 Claim

ABSTRACT OF THE DISCLOSURE

A device including an envelope having an open end and a front and a back side, each with a narrow transversely extending medial window therein, with the windows being in alignment with each other, and a flat card slidably disposed within the envelope with the upper edges of the card having sets of indicia disposed thereon, and the card having another set of indicia thereon adapted to be exposed in said medial windows, with the indicia including dates and locations and teams to appear at scheduled events, to provide sets of cooperative reading that can be read simultaneously with one setting of the card.

---

This invention relates generally to devices for providing in compact form schedules of events occurring at separate locations at common times, and more particularly but not by way of limitation, to a slide rule for facilitating selection, within an activity or undertaking, of multiple pairs of participants and locating the place at which a meeting between such pairs will take place.

The holding of events on a national and/or international scale, particularly in the area of athletics, is becoming increasingly popular. Individual events are held as one of a series of periodic meetings between pairs in a predetermined group. Frequently, an activity consists of more than one such group in which case meetings between pairs in each group are held simultaneously and frequently at the same general location. As the number of such groups increases, the degree of difficulty in identifying meetings held on a given date at a given location increases.

Numerous devices generally in the form of schedules have been provided to make available information as to time, location and opponent with respect to the entire season's activities of a single participant. These devices have been adequate for use by those whose major interest is in a single such participant. However, where a broader interest is involved within a single group, or where wide interest in two or more groups is present, these devices have proven inadequate.

Accordingly, the present invention contemplates a novel slide rule apparatus for aggregating information of time, place and participants with respect to all members within one or more groups in a compact device which can be easily adjusted to reveal all such information concerning each participant in each such group.

The novel slide rule comprises an outer housing having a slidable member cooperating therewith for facilitating the determination of all meetings of pairs of participants on each scheduled meetig date and identifying the location of each such meeting. Each side of the slide rule may be utilized solely for identifying meetings within a single group through alignment of participants competing within said group across the top of the outer housing to designate a first participant in each meeting and the meeting location and arranging on the slide in alignment with each meeting date the name of the second participant completing each competing pair. Alternatively, two or more groups may be included in each side of the slide rule in which case, as to each additional group, names of all competing participants are arranged along one or more apertures in the outer housing to designate said first participant in each meeting and the location, and said second participant in each competing pair is arranged on the slide opposite the meeting date.

Although the foregoing expressly describes the embodiment of the invention shown in the accompanying drawings and explained hereafter, in detail, such invention is not limited to the device so shown and explained. More specifically, it can be seen that said outer housing need not be in the form of a flat two-sided envelope having at least one open end as shown but can be constructed as a first component in the form of a cylinder or other three dimensional figure, in which case the second component represented by the slide would be designed to fit movably within. Further, said first component need not be a longitudinally enclosed housing but may be constructed in the form of a group index bearing surface having a guide or track for receiving a projection from a chronological schedule bearing second component.

Likewise, use of the top of the outer housing and/or apertures in said housing as demarcation points for alignment of indicia carried by the two components respectively described above, is not intended as being exhaustive and this invention contemplates any alternative means for arranging such indicia on two cooperating components whose selective interaction will produce the above described information. This may include variously located apertures, a single group index bearing line adapted for moving with respect to said chronological schedule bearing component or other similar means.

It is an important object of this invention to provide a device which furnishes complete schedules for all participants in one or more groups and which can be inserted into a wallet or small pocket without folding or bending.

A further object of this invention is to provide a novel slide rule for correlating all events within a single group or within several groups in a single compact device.

A still further object of this invention is to provide a slide rule device which can identify all events between pairs within one or more groups, occurring on a single date.

It is a further object of this invention to provide a compact device which incorporates a means for instantly showing the location of a multiplicity of events, identifying the participants and showing the dates on which such events occur.

It is a further object of this invention to provide a compact device which incorporates within a series of simultaneous events occurring in sequential order an indicator to selectively distinguish in vivid fashion all events occurring simultaneously.

A still further object of this invention is to provide a compact device incorporating means for showing location, participants and dates of scheduled events occurring in each of two or more years, seasons or other meeting periods.

Other objects and advantages of the invention will be evident from the following detailed description, read in conjunction with the accompanying drawings, which illustrate my invention.

In the drawings:

FIGURE 1 is a front view of a slide rule embodying the invention showing the face or front surface of the holder thereof in which the slide is fully inserted and showing all participants in a single group listed along the top of the holder and along an aperture across the holder midway between its ends.

FIGURE 2 is a view similar to FIGURE 1 depicting the opposite or back face of a holder on which has been inserted along the top thereof a series of participants and locations within one group and beneath the aperture across the holder midway between the ends a series of participants and locations within a second group. Dates of events are inserted on partially inserted slide and opposite each such date is the second participant in each scheduled event arranged for alignment with the corresponding competing first participant shown on the holder.

Figure 1:
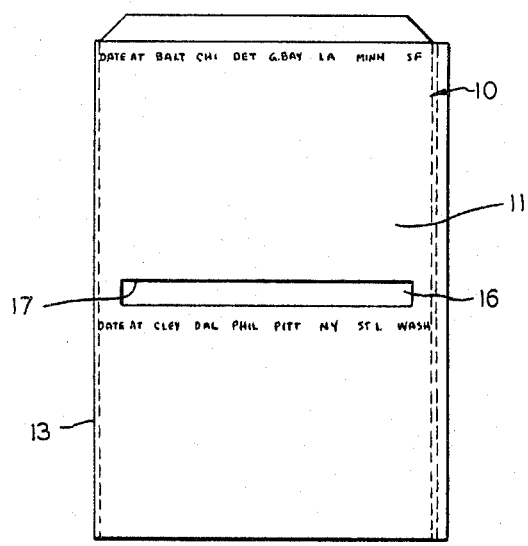
Figure 2:
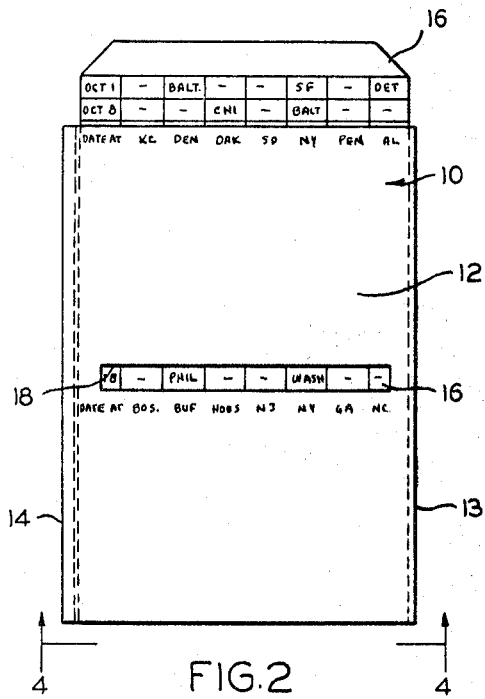
Figure 3:
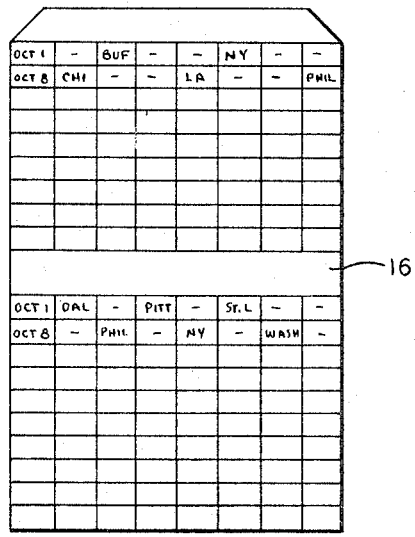
FIGURE 3 is the front view of the slide in FIGURE 1 removed from the holder and showing all dates on which events are scheduled for the group, with one of the participants in each event scheduled on each such date arranged laterally across the slide opposite each such date.
Figure 4:
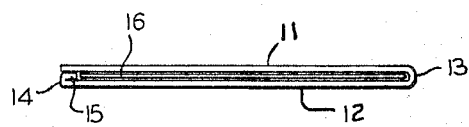
FIGURE 4 is an end view of the slide rule taken along the line 4—4 of FIGURE 2.

Referring to the drawings in detail, reference character 10 generally indicates the outer housing of a slide rule comprising a rectangular front plate 11 and a back plate 12 of a substantially identical configuration. Front plate 11 and back plate 12 are fashioned from a single piece of material folded at 13 along the entire length of slide rule 10 and likewise at 14 to form strip member 15. Strip member 15 is secured to front plate 11 in any convenient manner as by use of an adhesive. When so fastened, front plate 11 and back plate 12 form an enclosure open at each end for containing slide 16 in longitudinally movable relationship.

Aperture 17 in front plate 11 and aperture 18 in back plate 12 expose significant areas of the front and back of slide 16. Slide 16 is provided with a left hand margin on which are inserted in vertical alignment all dates on which events between participants within a single group are scheduled. Front plate 11 is provided with a lateral listing of all participants within the group across the top thereof, or alternatively, across such top and across said front plate 11 between the ends thereof immediately below aperture 17.

In lateral alignment with each date listed on slide 16 are all participants scheduled to participate away from the home location on such date. The arrangement of such participants on slide 16 is such that when each such participant is brought contiguous with the top of front plate 12 or of aperture 17, said participant is in vertical alignment with a participant carried by front plate 12 which comprises the second of a pair of competing participants meeting on the date with which said participant shown on the slide 16 is aligned. Participants indicated on front plate 12 also indicate the location of the event to be engaged in since the location of the participant is the location of the event.

Having thus described the invention, what is claimed is:

1. A device for indicating a series of scheduled events comprising a single piece of flat material folded along one side to provide a front side and a back side of an envelope, one edge of said folded envelope opposite its folded side having an inturned folded strip, the adjacent edge of the other side of the envelope being secured to said strip, said envelope having an open end and a closed end between said secured edge and the folded side, said front and back sides each having a narrow transversely extending medial window therein, said windows being in alignment with each other, a flat card slidably disposed within said envelope, said card having an upper portion extending above the upper edge of the open end of said envelope, a transverse portion of said card being exposed through said medial windows, a first set of indicia disposed on one side of said card transversely of said card and arranged downwardly in vertical columns, said indicia including a first vertical column of dates and other columns designating teams to appear in scheduled events, said first set of indicia on said card being exposed through said medial window and exposed along the portion of said card adjacent the upper edge of said envelope, a second set of indicia on said envelope extending transversely along the upper edge of said envelope and transversely of said envelope below the lower edge of said medial window, said second set of indicia including a location and team designation and cooperating with the set of indicia along the card portion adjacent the envelope edge and the set of indicia exposed in said medial window to indicate the date and location and teams scheduled for an event, and the opposite side of said card and the opposite side of said envelope having corresponding indicia for other dates and locations and teams to appear at scheduled events to provide four sets of cooperative reading that can be read simultaneously with one setting of said card with respect to said envelope.

References Cited
UNITED STATES PATENTS

| | | | |
|---|---|---|---|
| 1,166,675 | 1/1916 | Griffin | 235—89 |
| 1,400,652 | 12/1921 | Anderson | 235—89 |
| 1,686,843 | 10/1928 | Burke | 235—85 |
| 1,957,112 | 5/1934 | Smith | 40—65 |
| 2,171,873 | 9/1939 | Gould | 235—89 |
| 798,206 | 8/1905 | Paradis | 235—89 |
| 898,338 | 9/1908 | Diefenback | 40—64 |
| 1,621,686 | 3/1927 | Raschick | 235—89 |

LOUIS J. CAPOZI, *Primary Examiner.*

U.S. Cl. X.R.

40—65; 235—89